United States Patent [19]

Porcham

[11] Patent Number: 4,623,531
[45] Date of Patent: Nov. 18, 1986

[54] PROCESS FOR PRODUCING SILANE

[75] Inventor: Wolfgang Porcham, Mils, Austria

[73] Assignee: D. Swarovski & Co., Wattens, Austria

[21] Appl. No.: 707,039

[22] Filed: Mar. 1, 1985

[30] Foreign Application Priority Data

Mar. 13, 1984 [DE] Fed. Rep. of Germany ....... 3409172

[51] Int. Cl.$^4$ .............................................. C01B 33/04
[52] U.S. Cl. .................................... 423/347; 423/647
[58] Field of Search ............................... 423/347, 647

[56] References Cited

U.S. PATENT DOCUMENTS 2,933,374 4/1960 Cook et al. ........................... 423/347
3,078,218 2/1963 Sundermeyer ........................ 204/61
3,163,590 12/1964 Litz et al. ............................. 423/347

FOREIGN PATENT DOCUMENTS 1034159 7/1958 Fed. Rep. of Germany .

OTHER PUBLICATIONS

E. Wiberg & E. Amber, "Hydride of the Elements of Main Groups I-IV, 1971, pp. 29 and 35.
G. L. Flemmert, "Hydrogen Fluoride and Pyrogenic Silica from Fluosilicic Acid", Apr. 14, 1977, pp. 3-22.
Robert De Pape, "La Reduction Du Tetraflourure De Silicum Et Du Triflourure de Bore Par L'Hydrure De Calcium, Le Fluobourate De Calcium, pp. 186-196.
S. Ullmann, 4th edition, vol. 13, pp. 114-116.
Paul Hagnemuller, "Comptes Rendus", 1960, pp. 2032-2034.

Primary Examiner—John P. Sheehan
Attorney, Agent, or Firm—Sandler & Greenblum

[57] ABSTRACT

A process for producing silane, whereby silicon tetrafluoride is reacted with magnesium hydride in a melt of alkali or alkaline earth halides under a hydrogen partial pressure which is greater than the dissociation pressure of the magnesium hydride at the temperature of the melt.

19 Claims, No Drawings

PROCESS FOR PRODUCING SILANE

TECHNICAL FIELD

The present invention relates to a process for producing silane, $SiH_4$, by reacting silicon tetrafluoride, $SiF_4$, with magnesium hydride, $MgH_2$.

$$SiF_4 + 2MgH_2 \rightarrow SiH_4 + 2MgF_2$$

Silane is of great technical interest, especially for the production of modern integrated circuits and for the production of photovoltaic cells from amorphous silicon.

BACKGROUND ART

For the production of silane processes are known which are based on metallurgic silicon or else halosilanes as the starting material.

Of the halosilanes, $SiF_4$ is of particular technical interest due to its availability and its low cost price. It accumulates in large quantities in the exhaust gas during wet extraction of raw phosphates and can be obtained therefrom with a high degree of purity according to various processes, some of which have been tried out on an industrial scale, and described, for example, in Proc. Fert. Soc. (PFRSAZ) V 163,23 pp, 1977. In the form of a gaseous compound, $SiF_4$ can be easily purified further, if desired. With its 27 wt. % silicon content, $SiF_4$ has the highest silicon content of all silicon perhalides, and a higher silicon content than trochlorosilane, as well. It is therefore a very economical starting material for producing other silicon compounds.

German Pat. No. 1 034 159 discloses the conversion of silicon halides with complex alkali hydride boron trialkyl compounds or alkali hydride aluminum alcoholate compounds, dissolved in an organic solvent, into silicon hydrides. The disadvantages are that the resulting silicon hydride is contaminated by solvent vapors and boron or aluminum compounds, and the process can only be carried out discontinuously.

It is also known to convert $SiF_4$ with calcium hydride into silane at temperatures between 250° and 300° C. (Paul Hagenmueller, Robert de Pape, Comp. rend. 251, 2032–4 (1960); Robert de Pape, Ann. Chim., t. 8, 1963, p. 185-195). The disadvantage in this case is that the reaction soon comes to a standstill and silicon is precipitated. Thus, only 12% conversion was ascertained, for example, after a reaction time of 24 hours at 290° C.

It is disclosed in U.S. Pat. No. 2,933,374 to convert $SiF_4$ with hydrogen in an electric arc into fluoric silanes which are disproportionated via sodium fluoride into silane at temperatures between 125° and 300° C. The disadvantage in this case is that the conversion of $SiF_4$ into fluoric silanes has only a small yield in spite of a high use of energy, and $SiF_4$ is lost during the disproportionation with sodium fluoride due to the formation of sodium hexafluosilicate.

German Pat. No. 1 080 077 discloses a process and an apparatus for hydrating halogen-substituted compounds of the elements boron, silicon or germanium by reaction with alkali or alkaline earth hydrides in a melt of an alkali, ammonium or alkaline earth halide or halide mixture. However, this process requires the use of metallic hydrides which are stable in the melt at the relatively high working temperatures, e.g. lithium hydride. On the other hand, no information is stated in the description of either the process or the apparatus on the relation between the working temperature in the melt and the thermal decomposition of the metallic hydrides. On the contrary, it is assumed that the metallic hydrides are stable in the melt at the relatively high working temperatures.

However, if it is taken into account that sodium hydride and potassium hydride, for example, already begin to decompose at approx. 300° C. and that magnesium hydride already decomposes completely at approx. 280° C. (S. Ullmann, 4th edition, Vol. 13, p. 114 and 116, or E. Wiberg and E. Amberger, "Hydrides of the Elements of Main Groups I–IV", Elsevier 1971, p. 29 and 35), the use of precisely these metallic hydrides which are readily accessible technically is ruled out. Magnesium hydride, that alkaline earth hydride which may be manufactured of magnesium, the only inexpensive alkaline earth metal which is available on an industrial scale, cannot be used for the process in the publication because of thermal decomposition. In order to reduce the high cost prices for the metallic hydrides to be used, it is further proposed to design the reactor so that it can be used not only for silane synthesis, but also simultaneously for obtaining alkali or alkaline earth metals electrolytically and subsequently synthesizing the corresponding metallic hydride. Reactors suitable for all these reactions are of course elaborate and susceptible to disturbance.

DISCLOSURE OF INVENTION

The problem on which the invention is based is to provide a process for producing pure silane from the raw materials silicon tetrafluoride and magnesium hydride, which are available on an industrial scale.

It has been found that the conversion of $SiF_4$ into $SiH_4$ with $MgH_2$ can be realized at a high yield in a short reaction time when $MgH_2$ in a melt of alkali or alkaline earth halides is reacted with $SiF_4$ under a hydrogen partial pressure which is greater than the dissociation pressure of the $MgH_2$ at the working temperature in the melt.

Suitable melts should have a melting point as low as possible in order to be able to keep the hydrogen pressure low during conversion, spare the reactor material, keep the need for energy within limits and avoid thermal decomposition of the silane formed. The melts must react neither with $SiF_4$ nor with $SiH_4$. They should be free of water, hydroxide and oxide in order to avoid corrosion of the reactor and undesirable side reactions.

Mixtures of various alkali or alkaline earth halides are preferred. In order to obtain low melting points, it is advantageous in particular to use eutectic mixtures. Examples of suitable low-melting eutectic salt mixtures are:

| Composition (mol %) | FP of the Eutectics (°C.) |
| --- | --- |
| 41.0 RbCl/56.6 LiCl/2.4 NaCl | 318 |
| 40 KBr/60 LiBr | 348 |
| 24 KCl/43 LiCl/33 NaCl | 357 |
| 41.5 KCl/58.5 LiCl | 361 |
| 47 CaCl$_2$/38.5 NaCl/14.5 BaCl$_2$ | 450 |

DETAILED DESCRIPTION

In order to carry out the hydrogenation according to the invention, $MgH_2$ must be dissolved in the melt, in accordance with the working temperature in the melt, under hydrogen partial pressures which do not fall below the following values.

| Hydrogen Partial Pressure (bar) | Working Temperature in the Melt (°C.) |
|---|---|
| 2 | 300 |
| 6 | 350 |
| 16 | 400 |
| 39 | 450 |

A mixture of $SiF_4$ and $H_2$ is now introduced into this solution of $MgH_2$ in the melt which is under the corresponding hydrogen pressure. The ratio of the partial pressures of $SiF_4$ to $H_2$ may be as follows:

$$p_{SiF_4}:p_{H_2} = 1:0.5 \text{ to approximately } 1:20$$

It must be assured that the hydrogen partial pressure is greater than the dissociation pressure of the $MgH_2$ at the working temperature in the melt, i.e. has the values stated in the above table, for example.

At a working temperature of 400° C., for example, $p_{H_2}$ must $\geq$ 16 bar. It follows that $$p_{SiF_4}:p_{H_2} = 32:16 \text{ to } 0.8:16$$

$$p_{SiF_4} + p_{H_2} = p$$

For these limiting mixing proportions an overall pressure P of at least 48 or 16.8 bar, respectively, of the $SiF_4/H_2$ mixture therefore results. In this case the hydrogen pressure is now increased to 48 or 16.8 bar, respectively, above the solution of $MgH_2$ in the melt, which was produced at a hydrogen pressure $\geq 16$ bar, whereupon one can begin introducing the $SiF_4/H_2$ mixture.

The concentration of hydride ions in the melt should not fall below approximately 0.3 wt. %. This corresponds to a magnesium hydride concentration in the melt of approximately 4 wt. %.

In order to stabilize the silane, a surplus of hydrogen can be maintained in the headspace of the reactor, advantageously $H_2/SiH_4 \geq 3$. To carry out the synthesis of $SiH_4$ from $SiF_4$, a heatable reactor of sufficient pressure resistance may be used which is equipped with a powerful stirring unit, a thermometer, a gas inlet tube allowing the $SiF_4/H_2$ mixture to be introduced into the melt, a gas exit tube in the headspace of the reactor, an opening for introducing the melt, an opening for discharging the melt, and an apparatus with which $MgH_2$ can be added in doses under the required hydrogen pressure.

According to he inventive process, yields of up to 90% with respect to the $SiF_4$ used may be obtained. A particular advantage is that the silane formed is essentially contaminated only by non-converted $SiF_4$ as well as very small amounts of fluoric silanes and hydrogen as the carrier gas, but not by hydrocarbons. $SiF_4$ and fluoric silanes can easily be separated in molecular sieves or slightly basic anion exchangers. The separation of $SiH_4$ and $H_2$ can take place easily due to the very different boiling points or freezing points by condensing or freezing out $SiH_4$ or else due to the very different adsorption behavior, e.g. by adsorping the $SiH_4$ portion on active carbon.

A further advantage of the process which is important primarily for the production of silane qualities for the electronic industry, is the absence of diborane in the silane formed, even when $SiF_4$ which is contaminated by boron trifluoride is used, for example, because diborane continues to react with the hydride ions in the melt to form non-volatile boronate.

Finally, it is advantageous that the composition of the melt is virtually not changed during the reaction; it is merely enriched by difficiltly soluble, crystalline $MgF_2$ which can be easily separated by sedimentation.

The new process can therefore also be carried out semicontinuously by continuously introducing $MgH_2$ into the melt along with the $SiF_4/H_2$ mixture. After a certain time, which is determined by the volume of the melt, the stirring unit is turned off, $MgF_2$ sedimented and drawn off. The $MgF_2$ obtained can be used advantageously to produce hydrofluoric acid due to its high fluorine content. The inventive process is therefore particularly economical because it allows for the conversion of both the silicon and the fluorine content of $SiF_4$, which itself is worthless and was regardly primarily as a harmful substance up to now, into products of technical interest.

An advantageous embodiment of the inventive process consists in adding not only $MgH_2$ to the melt, but also 0.5 to 20 wt. %, in particular 5 to 15 wt. %, of potassium fluoride, rubidium fluoride or cesium fluoride. It has been found that the flow rate of the $SiF_4/H_2$ mixture through such a melt could be greatly increased without reducing the conversion of silane, relative to the $SiF_4$ used. Without insisting on this theory, one might attribute this finding to an increase in the hydride concentration in the solution in accordance with the equation $$2MeF + MgH_2 \rightarrow 2MeH + MgF_2$$

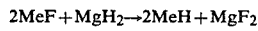
Me = K, Rb or Cs so that the melt is then saturated not only with $MgH_2$, but also with MeH and therefore reacts more quickly with $SiF_4$, or else to a temporary chemisorption of the $SiF_4$ on dissolved fluoride, temporarily forming hexafluorosilicate, which ultimately leads to an increase in the residence time of $SiF_4$ in the melt and thus to conversion with a higher yield.

According to a further advantageous embodiment of the process the necessary $MgH_2$ is produced from magnesium and $H_2$ directly in the reactor. For this purpose, magnesium powder, which may be pretreated in the known manner with catalysts such as iodine, magnesium iodide, mercury chloride or titanium chloride, may be introduced into the reactor, which is already charged with melt, and this magnesium powder converted into $MgH_2$ at a temperature of 318°–450° C. and a hydrogen pressure of 100 to 200 bar.

In the following, the invention shall be described in more detail with reference to examples.

EXAMPLE 1

The reaction was carried out in a heatable, 1.5 liter stainless steel reactor, suitable for operating pressures up to 25 bar, equipped with a double impeller stirrer, a thermometer, a gas inlet tube allowing for the $SiF_4/H_2$ mixture to be introduced into the melt, a silane outlet at the headspace of the reactor, an opening for introducing the melt, and an apparatus for introducing $MgH_2$.

The reactor was charged with 0.9 liters of eutectic melt of KCl/LiCl/NaCl.
Starting materials:
15 g $MgH_2$ (0.57 mol)

24 g SiF$_4$ (0.23 mol)

MgH$_2$ was dissolved at 380° C. in the melt under a hydrogen pressure of 20 bar. SiF$_4$ was mixed with H$_2$ so that the ratio of the partial pressures p$_{SiF4}$:p$_{H2}$=1:4 and the overall pressure P =20 bar.

This SiF$_4$/H$_2$ mixture was passed through the melt. Silane was separated from the emerging gas stream by being frozen out. After 69 minutes the SiF$_4$ supply was turned off.

Yield: 6.9 g silane (0.21 mol). This corresponds to 93% of the theory with respect to the SiF$_4$ used.

EXAMPLE 2

The same reactor was used as in Example 1. The reactor was charged, however, with 0.9 liters of eutectic melt of KCl/LiCl/NaCl containing 10% potassium fluoride, KF.

Starting materials:

22 g MgH$_2$ (0.84 mol)

24 g SiF$_4$ (0.23 mol)

The working conditions were the same as in Example 1. After 34 minutes the SiF$_4$ supply was turned off.

Yield: 6.7 g silane (0.21 mol). This corresponds to 90% of the theory with respect to the SiF$_4$ used.

What is claimed is:

1. A process for producing silane comprising reacting silicon tetrafluoride with magnesium hydride in a melt having a composition comprising members selected from the group consisting of alkali and alkaline earth halides in the presence of hydrogen, said melt having a temperature sufficient for said reacting to proceed and said hydrogen exerting a hydrogen partial pressure which is sufficient to prevent the magnesium hydride from disassociating at the temperature of the melt.

2. A process in accordance with claim 1, further comprising forming the magnesium hydride from magnesium and hydrogen in situ in the melt.

3. A process in accordance with claim 1 wherein said melt is a eutectic.

4. A process in accordance with claim 3, wherein said halides include members selected from the group consisting of potassium fluoride, rubidium fluoride and cesium fluoride.

5. A process in accordance with claim 4, wherein hydride ions are present in the melt at a concentration of at least 0.3 wt. %.

6. A process in accordance with claim 5, wherein said reacting is performed in a reactor having a head space and a surplus of hydrogen is maintained in the head space of the reactor.

7. A process in accordance with claim 3, wherein said eutectic is a mixture comprising at least two salts.

8. A process in accordance with claim 4, wherein said halides are present in said melt in an amount within the range of about 0.5 to 20 wt. %.

9. A process in accordance with claim 8, wherein said amount is within the range of about 5 to 15 wt. %.

10. A process in accordance with claim 1, wherein said melt is non-reactive with silicon tetrafluoride and silane.

11. A process in accordance with claim 1, wherein said melt is free of water, hydroxide and oxide.

12. A process in accordance with claim 1, wherein said temperature is within the range of about 300° C. to 450° C.

13. A process in accordance with claim 1, further comprising the step of dissolving said magnesium hydride in said melt to form a solution prior to said step of reacting.

14. A process in accordance with claim 13, wherein said step of reacting is initialed by introducing silicon tetrafluoride and hydrogen into said solution.

15. A process in accordance with claim 14, wherein said silicon tetrafluoride and hydrogen exert partial pressures on said melt with the ratio of said partial pressures of silicon tetrafluoride to hydrogen being within the range of about 1:0.5 to about 1:20.

16. A process in accordance with claim 1, wherein said silicon tetrafluoride is contaminated by boron trifluoride and said silane is essentially free of borane.

17. A process in accordance with claim 1, wherein the composition of the melt is maintained essentially unchanged during said step of reacting.

18. A process in accordance with claim 2, wherein said forming the magnesium hydride comprises introducing magnesium powder into said melt maintained at a temperature within the range of about 318° C. to about 450° C. wherein said hydrogen partial pressure is within the range of 100 to 200 bar.

19. A process for producing silance comprising the step of reacting silicon tetrafluoride with magnesium hydride in a melt having a temperature sufficient for said reacting to proceed, said melt being non-reactive with SiF$_4$ and SiH$_4$ and being free of water, hydroxide and oxide and having a composition comprising members selected from the group consisting of alkali and alkaline earth alides, in the presence of hydrogen, said hydrogen exerting a partial pressure which is sufficient to prevent the magnesium hydride from disassociating at the temperature of the melt to produce reaction products comprising silane.

* * * * *

UNITED STATES PATENT AND TRADEMARK OFFICE
CERTIFICATE OF CORRECTION

PATENT NO. : 4,623,531
DATED : November 18, 1986
INVENTOR(S) : Wolfgang PORCHAM

It is certified that error appears in the above-identified patent and that said Letters Patent is hereby corrected as shown below:

```
Column 1, line 17, after "silane" insert ---,---.
         line 44, change "Hagenmueller" to ---Hagnemueller---;
         line 44, change "Comp. rend." to ---"Comp. Rend."---;
and
         line 46, change "185-195" to ---186-196---.

Column 3, line 33, change "≥" to --->---;
         line 51, change "he" to ---the--- before
"inventive process"; and
         line 66, after "industry" delete ---,---.

Column 6, line 40 change "silance" to ---silane---; and
         line 47, change "alides" to ---halides---.
```

Signed and Sealed this

First Day of December, 1987

Attest:

DONALD J. QUIGG

*Attesting Officer*  *Commissioner of Patents and Trademarks*